United States Patent
Wong et al.

(10) Patent No.: US 8,239,329 B2
(45) Date of Patent: Aug. 7, 2012

(54) DATA STORAGE MEDIUM, SOFTWARE INSTALLATION METHOD AND COPYRIGHT PROTECTION MODULE

(75) Inventors: Shih-Fang Wong, Taipei Hsien (TW); Jian-Guo Zhu, Shenzhen (CN); Jun-Fang Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 948 days.

(21) Appl. No.: 12/252,372

(22) Filed: Oct. 16, 2008

(65) Prior Publication Data

US 2009/0106751 A1 Apr. 23, 2009

(30) Foreign Application Priority Data

Oct. 17, 2007 (CN) .......................... 2007 1 0202088

(51) Int. Cl.
*G06F 21/00* (2006.01)
(52) U.S. Cl. .............................. 705/57; 726/32; 717/174
(58) Field of Classification Search .................... 705/57; 726/32; 717/174
See application file for complete search history.

(56) References Cited

U.S. PATENT DOCUMENTS

| | | | | |
|---|---|---|---|---|
| 5,745,568 A * | 4/1998 | O'Connor et al. | ............... | 705/56 |
| 6,681,212 B1 * | 1/2004 | Zeng | ................ | 705/51 |
| 6,711,130 B1 * | 3/2004 | Sato | ........................... | 370/230.1 |
| 6,988,206 B1 * | 1/2006 | Alcalay et al. | ............. | 369/275.5 |
| 7,827,111 B2 * | 11/2010 | Oshima et al. | .................. | 705/56 |
| 8,139,458 B2 * | 3/2012 | Ko et al. | ..................... | 369/53.21 |
| 2001/0002479 A1* | 5/2001 | Asoh | ......................... | 711/115 |
| 2001/0024420 A1* | 9/2001 | Carson et al. | ............. | 369/275.3 |
| 2002/0178145 A1* | 11/2002 | Ishida | .............................. | 707/1 |
| 2005/0177823 A1* | 8/2005 | Miyake | ........................ | 717/159 |
| 2007/0240155 A1* | 10/2007 | Shlomai | ....................... | 717/174 |

FOREIGN PATENT DOCUMENTS

TW 200512647 A 4/2005

OTHER PUBLICATIONS

Internet Archive Wayback Machine, archive of DVD Demystified. Taylor, Jim. Available from <http://web.archive.org/web/20050315020918/http://www.dvddemystified.com/dvdfaq.html#1.11>. Archived Mar. 15, 2005.*
How Computers Work, Seventh Edition. White, Ron. Que Publishing, 2004. ISBN 0-7897-3033-2. Entire book cited.*

* cited by examiner

*Primary Examiner* — Jamie Kucab
(74) *Attorney, Agent, or Firm* — Altis Law Group, Inc.

(57) ABSTRACT

A data storage medium includes a first storage unit and a second storage unit. The first storage unit is used to store a target electronic device ID, the second storage unit stores software installation data. The software installation data includes a copyright protection module, a software installation program, and a software data. When the software installation data is invoked to install the software data, the copyright protection module is invoked and automatically runs. The copyright protection module accesses the first storage unit and reads the target electronic device ID. The software data can be installed in the target electronic device only if the first storage unit contained the target electronic device ID or the first storage unit is writable and the target electronic device ID is stored in the first storage unit successfully.

14 Claims, 4 Drawing Sheets

DATA STORAGE MEDIUM, SOFTWARE INSTALLATION METHOD AND COPYRIGHT PROTECTION MODULE

BACKGROUND

1. Technical Field

The present invention relates to data storage mediums and software installation method, and particularly to copyright protection data storage mediums, copyright protection software installation method, and copyright protection modules.

2. General Background

In recent years, the piracy of software products has seen unprecedented growth. Mass distribution of pirated software not only deprives software manufacturers of their earnings, but also allows other subsequent software pirates to pirate the unlicensed copies of that application and thereby extending the damage exponentially. As such, piracy has often resulted in inflated software prices and irreparable damage to software companies.

Accordingly, it is necessary to provide copyright protection of data storage medium to overcome the above-identified deficiencies in software products.

SUMMARY

A method for installing software is provided. The method includes determining whether the identification (ID) of the target electronic device is stored on the software installation disk. If the ID is stored on the installation disk the software is installed; if the ID is not on the installation disk, the disk is checked for free space and if free space exists on the disk, the electronic device ID is stored in the free space, on the disk, and the software is installed on the electronic device.

A data storage medium and a copyright protection module capable of preventing software pirate are also provided.

Other advantages and novel features will become more apparent from the following detailed description of embodiments when taken in conjunction with the accompanying drawings.

BRIEF DESCRIPTION OF THE DRAWINGS

The components in the drawings are not necessarily drawn to scale, the emphasis instead being placed upon clearly illustrating the principles of the present data storage medium. Moreover, in the drawings, like reference numerals designate corresponding parts throughout the several views.

DETAILED DESCRIPTION OF THE EMBODIMENTS

Figure 1:
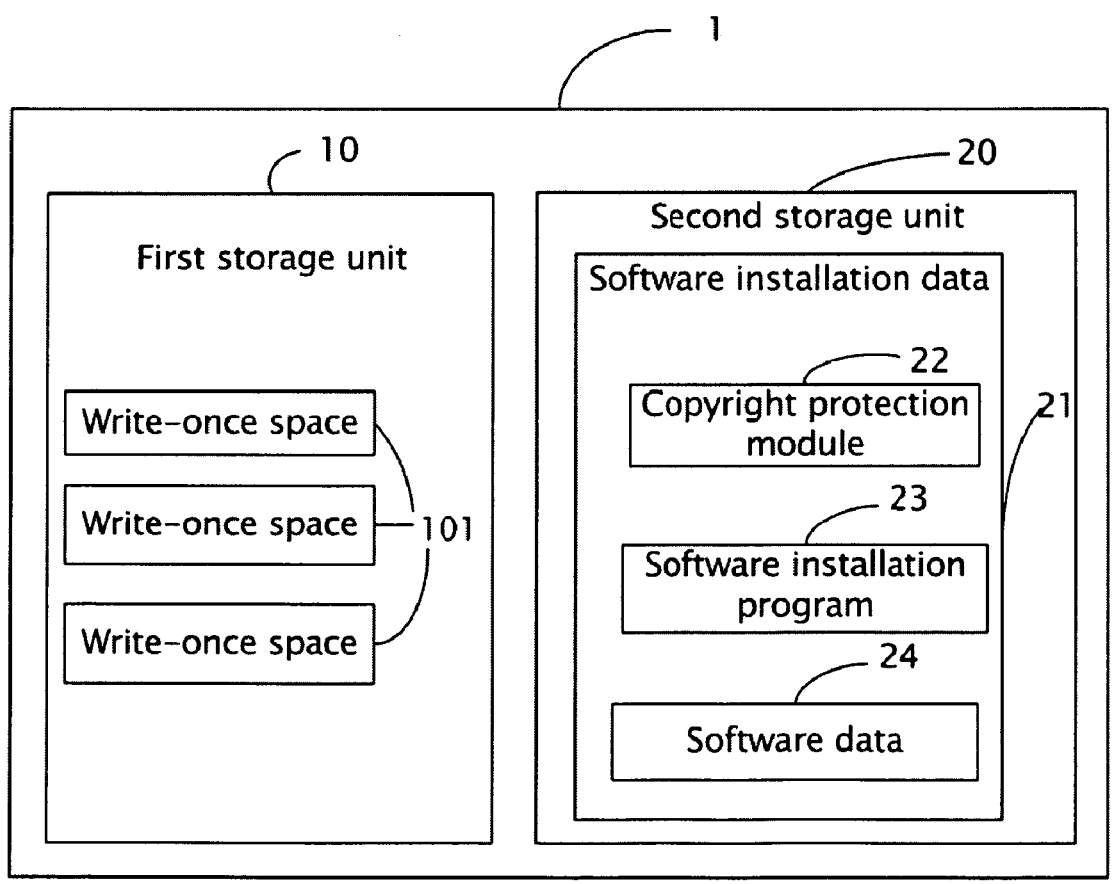
FIG. 1 is a block diagram of a data storage medium according to an exemplary embodiment.

Referring to FIG. 1, a data storage medium 1 includes a first storage unit 10 and a second storage unit 20. The first storage unit 10 includes a plurality of write-once spaces 101. The second storage unit 20 is a read-only storage space which stores software installation data 21. The software installation data 21 consist of a copyright protection module 22, a software installation program 23, and software data 24. The copyright protection module is an auto-run batch file. The software installation program 23 can only be invoked by the copyright protection module 22. The software installation program 23 is configured to install software data 24 to a target electronic device (not shown).

The target electronic device can be a mobile phone, a personal digital assistant (PDA), a computer, etc. The data storage medium 1 can be a floppy disk, a compact disc (CD), a flash memory or a secure digital (SD) card. To better disclose the embodiment, a computer is used as the target electronic device, and an installation CD 1 is used as the data storage medium 1.

The first storage unit 10 is hidden and can only be accessed by the copyright protection module 22. In each installation CD 1, the first storage unit 10 is assigned a unique physical address, and the copyright protection module 22 accesses the first storage unit 10 through a corresponding addressing manner. So, the copyright protection module 22 can only access the first storage unit 10 if both the copyright protection module 22 and the first storage unit 10 are on a same installation CD 1 according to the addressing manner. The addressing manner can be absolute addressing, relative addressing, etc.

The write-once space 101 of the first storage unit 10 is configured to store a hardware identifier (ID) of the target computer (hereinafter, the target computer ID). The computer ID may be a CPU serial number, a motherboard serial number, etc. Each write-once space 101 can be written only one time, that is, each of the write-once space 101 can only store one computer ID.

Figure 2:
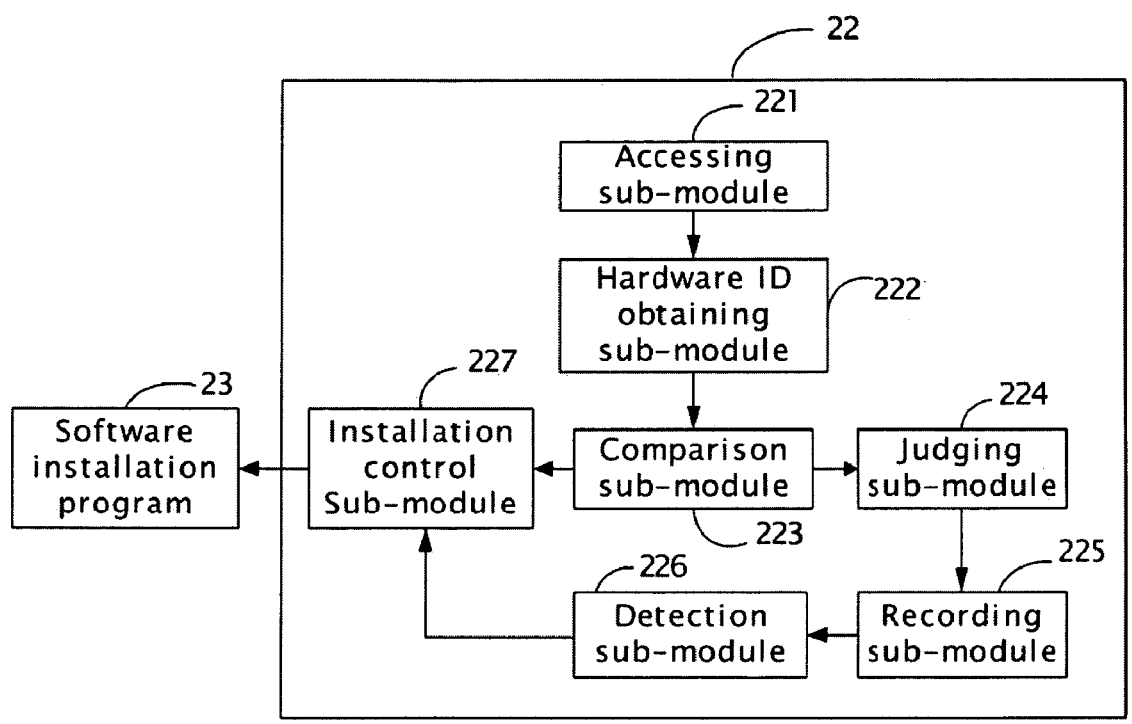
FIG. 2 is a block diagram of a copyright protection module according to an exemplary embodiment.

Referring also to FIG. 2, the copyright protection module 22 includes an accessing sub-module 221, a hardware ID obtaining sub-module 222, a comparison sub-module 223, a judging sub-module 224, a recording sub-module 225, a detection sub-module 226, and an installation control sub-module 227.

The accessing sub-module 221 is configured to access the first storage unit 10 through the addressing instruction. The hardware ID obtaining sub-module 222 is configured to read the target computer ID. The comparison sub-module 223 is configured to detect whether the first storage unit 10 already stores the target computer ID. The judging sub-module 224 is configured to detect whether the first storage unit 10 has free space (namely detects whether the first storage unit is writable). The recording sub-module 225 is configured to store the target computer ID in the first storage unit 10 when the judging sub-module 224 detects the first storage unit 10 has free spaces. The detection sub-module 226 is configured to detect whether the target computer ID has been stored in the first storage unit 10 successfully. The installation control sub-module 227 is configured to control the software installation program 23 to install the software data 24 to the target computer.

When the installation CD 1 is connected to the target computer and is driven by the target computer, the copyright protection module 22 is invoked and runs automatically.

In detail, when the copyright protection module 22 is invoked, the accessing sub-module 221 attempts to access the first storage unit 10 though the addressing instruction as described hereinbefore. If the accessing sub-module 221 fails to access the first storage unit 10, the installation control sub-module 227 stops the software installation program 23 from installing the software data 24. If the accessing sub-module 221 successfully accesses the first storage unit 10, then the hardware ID obtaining module 222 reads the target computer ID.

The comparison sub-module 223 detect whether the first storage unit 10 already stores the target computer ID, namely the comparison sub-module 223 searches the first storage unit 10 for the target computer ID, in a condition that the target computer ID is found in one of the plurality of write-once spaces, the installation control sub-module 227 invokes the software installation program 23 to install the software data 24 to the target computer.

In a condition that the target computer ID is not found, the judging sub-module 224 detects whether the first storage unit 10 has free space, that is, the judging sub-module 224 detects whether the first storage unit 10 has write-once space 101 that is free/empty/writable. In a condition that at least one of the plurality of write-once spaces 101 is free, the recording sub-module 225 stores the target computer ID in the writable write-once space 101 and the detection sub-module 226 detects whether the target computer ID is stored in the write-once spaces 101 successfully.

If the detection sub-module 226 detects the target computer ID has been stored successfully, the installation control sub-module 227 controls the software installation program 23 to install the software data 24 to the target computer.

The installation control sub-module 227 controls the software installation program 23 to install software data 24 to the target computer, on the condition that the comparison sub-module 223 detects that the first storage unit 10 contains the target computer ID. The installation control sub-module 227 also controls the software installation program 23 to install software data 24 to the target computer, on the condition that the judging sub-module 224 detects that the first storage unit 10 has at least one of the plurality of write-once spaces 101 is free and after the detection sub-module 226 detects that the target computer ID has already been successfully stored in the write-once spaces 101 that is free. Otherwise, the installation control sub-module 227 stops the software installation program 23 from installing the software data 24 to the target computer.

The process of running the copyright protection module 22 is hidden and run in the background. When the software installation program 23 is running and installing the software data 24, the computer displays a navigation menu to navigate the user to install the software data 24 in the computer.

The software data 24 can only be installed using the software installation data 21 only after the copyright protection module 22 has performed/detected predetermined requirements. Because each of the write-once space 101 can only store one computer ID, and the predetermined requirements involve the first storage unit 10 of the data storage medium 1 which has stored the target computer ID or has free space to store the target computer ID, therefore, the count of the write-once spaces 101 represents a maximum amount of different computers (electronic devices) that can be installed with the software data 24 using the data storage medium 1.

Because the predetermined requirements involve accessing the first storage unit 10, therefore, the data storage medium 1 must be used whenever installing the software data 24. In other words, even if corresponding data is copied to the device and installation is attempted without using the data storage medium 1, the copyright protection module 22 is not able to access data from the first storage unit 10 of the data storage medium 1 and the installation would be unsuccessful.

Figure 3:
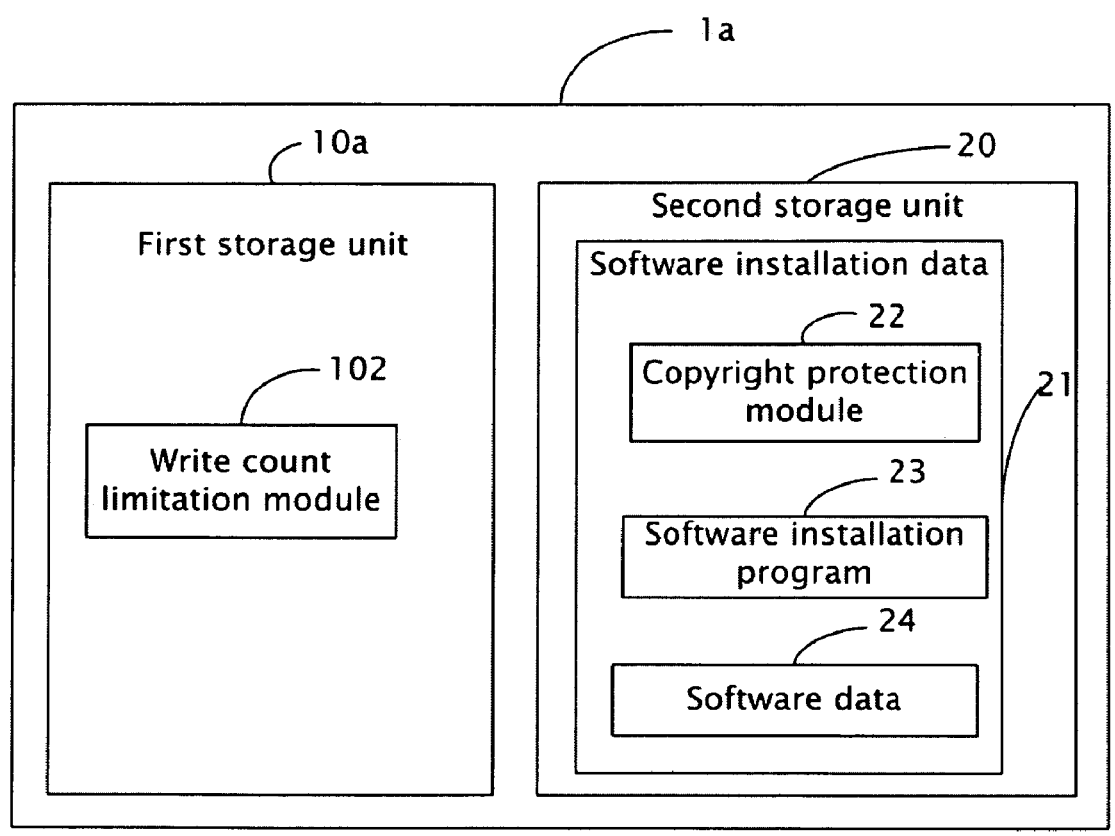
FIG. 3 is a block diagram of a data storage medium according to another exemplary embodiment.

FIG. 3 is a block diagram of a data storage medium 1a according to another exemplary embodiment. In another exemplary embodiment, the data storage medium 1a includes a first storage unit 10a and a second storage unit 20. The first storage unit 10a is a storage space which can be written repeatedly but for a limited number of times. The first storage unit 10a includes a write count limitation module 102. The write count limitation module 102 defines an initial writable count, the initial writable count is the limited count that the first storage unit 10a can be written. Each time the first storage unit 10a is written to, the writable count of the write count limitation module 102 decreases by one. That means the number of the target computers allowed to install the software data 24 decreases by one. In another exemplary embodiment, the write count limitation module 102 can be a subtracting counter.

Referring also to FIG. 2, in another exemplary embodiment, the judging sub-module 224 is configured to detect whether the first storage unit 10a is writable. That is, the judging sub-module 224 obtains the writable count from the write count limitation module 102 and detects whether the writable count is equal to zero. If the writable count of the write count limitation module is equal to zero, the judging sub-module 224 judges the first storage unit 10a is not free, the installation control sub-module 227 stops the software installation program 23 from installing the software data 24. In a condition that the writable count of the write count limitation module 102 is not equal to zero, namely the first storage unit 10a is writable, the recording sub-module 225 stores the target computer ID in the first storage unit 10a and the detection sub-module 226 detects whether the target computer is stored successfully.

If the detection sub-module 226 detects the target computer ID is stored successfully, the installation control sub-module 227 controls the software installation program 23 to install the software data 24 to the target computer.

Figure 4:
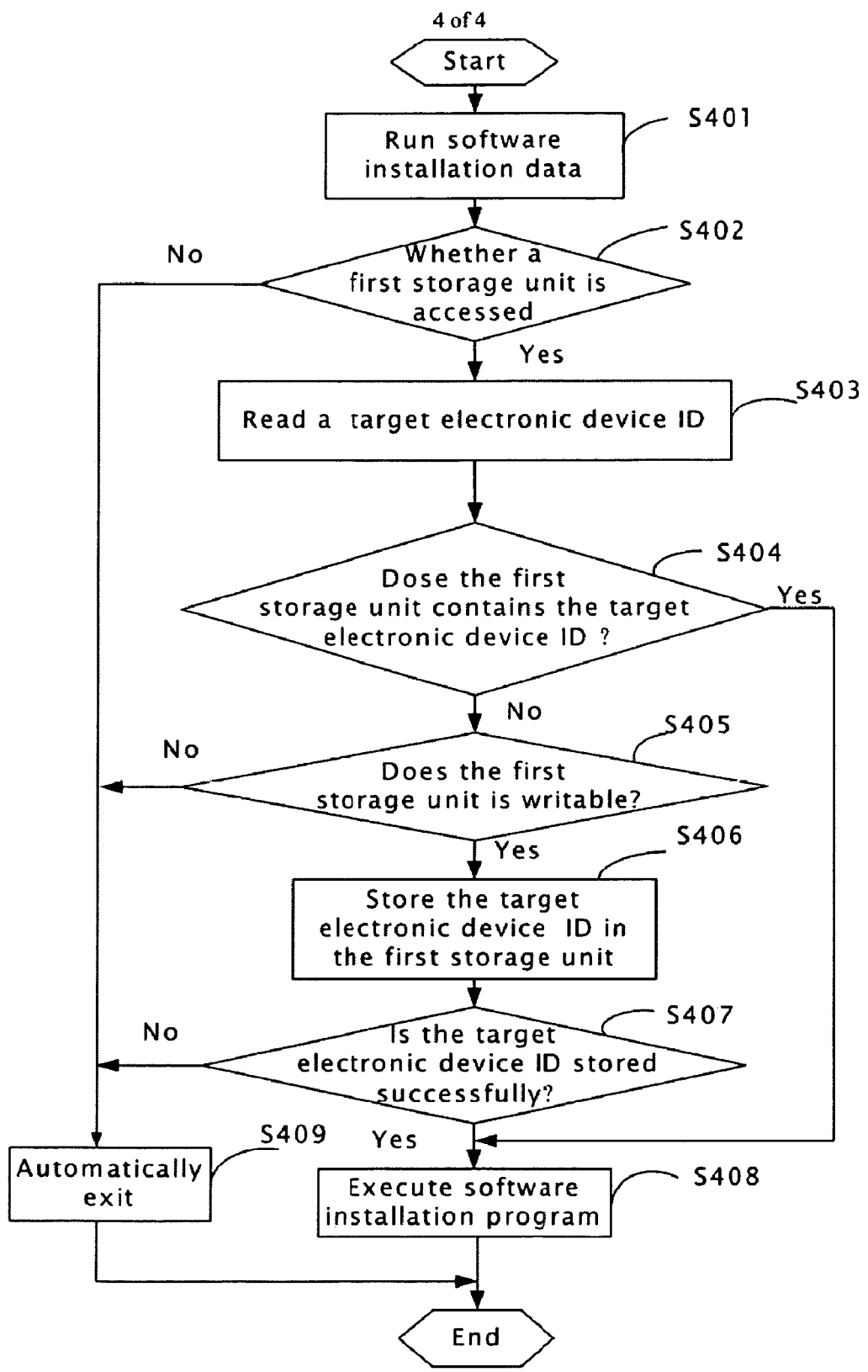
FIG. 4 is a flowchart illustrating a method for installing software according to an exemplary embodiment.

FIG. 4 is a flowchart illustrating a method for installing software according to an exemplary embodiment. In step S401, when the software installation data 21 is invoked to install the software data 24, the copyright protection module 22 is invoked and runs automatically in the background.

In step S402, the accessing sub-module 221 attempts to access the first storage unit 10 of installation CD 1 through the addressing manner when the copyright protection module 22 is invoked.

If the accessing sub-module 221 accesses the first storage unit 10 successfully, in step S403, the hardware ID obtaining sub-module 222 reads the target computer ID.

In step S404, the comparison sub-module 223 detect whether the first storage unit 10 already stores the target computer ID, namely the comparison sub-module 223 judges whether the target computer ID is found in the first storage unit 10.

In a condition that the target computer ID is not found, in step S405, the judging sub-module 224 detects whether the first storage unit 10 is writable or not.

If the first storage unit 10 is writable, in step S406, the recording sub-module 225 stores the target computer ID in the first storage unit 10.

In step S407, the detection sub-module 226 detects whether the target computer ID is stored successfully.

If the target computer ID is stored successfully, in step S408, the installation control sub-module 227 controls the software installation program 23 to install software data 24 to the target computer.

Else, in step S409, the installation control sub-module 227 stops the software installation program 23 from installing the software data 24 to the target computer, and the software installation program 23 automatically exits.

It is believed that the present embodiments and their advantages will be understood from the foregoing description, and it will be apparent that various changes may be made thereto without departing from the spirit and scope of the invention or sacrificing all of its material advantages, the examples hereinbefore described merely being exemplary embodiments of the present invention.

What is claimed is:

1. A data storage medium comprising:
    a first storage unit configured to store electronic device IDs; and
    a second storage unit comprising:
        software data;
        a software installation program configured to install the software data to a target electronic device; and
        a copyright protection module, comprising:
            an accessing sub-module configured to access the first storage unit;
            a hardware ID obtaining sub-module configured to read a target electronic device ID from the target electronic device;
            a comparison sub-module configured to detect whether the target electronic device ID is found in the first storage unit;
            a judging sub-module configured to detect whether the first storage unit is writable;
            a recording sub-module configured to record the target electronic device ID in the first storage unit when the judging sub-module detects the first storage unit is writable;
            a detection sub-module configured to detect whether the target electronic device ID is stored in the first storage unit successfully; and
            an installation control sub-module configured to control the software installation program to install the software data to the target electronic device when the first storage unit already stores the target electronic device ID, or when the first storage unit is writable and the target electronic device ID is stored in the first storage unit successfully.

2. The data storage medium of claim 1, wherein the first storage unit is hidden and can only be accessed by the copyright protection module.

3. The data storage medium of claim 1, wherein the accessing sub-module accesses the first storage unit according to an addressing manner.

4. The data storage medium of claimed 1, wherein the first storage unit comprises a plurality of write-once spaces, and each of the write-once spaces is configured to store one electronic device ID.

5. The data storage medium of claim 1, wherein the first storage unit is a writable space with a limited write count, the first storage unit comprises a write count limitation module which is configured to determine the writable count of the first storage unit, each time data is written to the first storage unit, the write count limitation module decreases the writable count by one.

6. The data storage medium of claim 1, wherein the data storage medium can be a compact disc (CD), a floppy disk, a flash memory or a secure digital (SD) card.

7. A method for installing software, the method comprising:
    invoking software installation data;
    detecting whether a first storage unit is accessed successfully;
    reading a target electronic device ID from a target electronic device if the first storage unit is accessed successfully;
    detecting whether the first storage unit already contains the target electronic device ID of the target electronic device;
    installing a software data to the target electronic device if the first storage unit already stored the target electronic device ID of the target electronic device;
    detecting whether the first storage unit is writable, which is performed only if the target electronic device ID of the target electronic device is not found in the first storage unit;
    storing the target electronic device ID of the target electronic device in the first storage unit if the first storage unit is writable;
    judging whether the target electronic device ID of the target electronic device is stored in the first storage unit successfully; and
    installing the software data to the target electronic device if the target electronic device ID of the target electronic device is stored in the first storage unit successfully.

8. The method of claim 7, wherein the step of detecting whether a first storage unit is accessed successfully comprises:
    accessing the first storage unit according to an addressing manner.

9. The method of claim 7, wherein the step of detecting whether the first storage unit is writable comprises:
    detecting whether the first storage unit comprises at least one writable write-once space.

10. The method of claim 7 wherein the step of detecting whether the first storage unit is writable comprises:
    obtaining a writable count of a write count limitation module to judge whether the first storage unit is writable.

11. A copyright protection module, the copyright protection module is stored in a data storage medium, which is used for protecting a software installation program from piracy, the data storage medium includes a first storage unit and a second storage unit, the copyright protection module comprising:
    an accessing sub-module configured to access the first storage unit,
    a hardware ID obtaining sub-module configured to read a target electronic device ID from a target electronic device;
    a comparison sub-module configured to detect whether the first storage unit already stores the target electronic device ID;
    a judging sub-module configured to detect whether the first storage unit is writable;
    a recording sub-module configured to store the target electronic device ID in the first storage unit when the judging sub-module detects the first storage unit is writable;
    a detection sub-module configured to detect whether the target electronic device ID is stored in the first storage unit successfully; and
    an installation control sub-module configured to control the software installation program to install software data to the target electronic device when the first storage unit stores the target electronic device ID, or when the first storage unit is writable and the target electronic device ID is stored in the first storage unit successfully.

12. The copyright protection module of claim 11, wherein the accessing sub-module accesses the first storage unit according to an addressing manner.

13. The copyright protection module of claimed 11, wherein the first storage unit comprising a plurality of write-once space, the target electronic device ID is stored in the write-once space, the judging sub-module through detecting whether the first storage unit has at least one of the plurality of write-once spaces is free to determine whether the first storage unit is writable.

14. The copyright protection module of claim 11, wherein the first storage unit is a writable space with a limited write count, the first storage unit comprise a write count limitation module which is configured to determine writable count of the first storage unit, each time data is written to the first storage unit, the write count limitation module decreases the writable count by one, the judging sub-module through obtaining the writable count of the write count limitation module to determine whether the first storage unit is writable.

* * * * *